(12) United States Patent
Zhou (10) Patent No.: US 9,558,709 B2
(45) Date of Patent: Jan. 31, 2017

(54) MOBILE TERMINAL AND DISPLAY CONTROL METHOD

(75) Inventor: Yifeng Zhou, Tokyo (JP)

(73) Assignee: NEC CORPORATION, Tokyo (JP)

(*) Notice: Subject to any disclaimer, the term of this patent is extended or adjusted under 35 U.S.C. 154(b) by 190 days.

(21) Appl. No.: 13/702,513

(22) PCT Filed: Jul. 4, 2011

(86) PCT No.: PCT/JP2011/065257
§ 371 (c)(1),
(2), (4) Date: Dec. 6, 2012

(87) PCT Pub. No.: WO2012/017763
PCT Pub. Date: Feb. 9, 2012

(65) Prior Publication Data
US 2013/0082902 A1    Apr. 4, 2013

(30) Foreign Application Priority Data
Aug. 5, 2010   (JP) .................................. 2010-176254

(51) Int. Cl.
*G09G 5/00* (2006.01)
*G06F 1/16* (2006.01)

(52) U.S. Cl.
CPC ............... *G09G 5/00* (2013.01); *G06F 1/1615* (2013.01); *G06F 1/1647* (2013.01); *G06F 1/1677* (2013.01); *G09G 2360/04* (2013.01)

(58) Field of Classification Search
CPC .... G06F 1/1615; G06F 1/1647; G06F 1/1677; G09G 2360/04; G09G 5/00
USPC .................................................. 345/156–184
See application file for complete search history.

(56) References Cited

U.S. PATENT DOCUMENTS

2007/0232336 A1* 10/2007 Kim et al. .................... 455/466
2010/0182265 A1*  7/2010 Kim et al. .................... 345/173

FOREIGN PATENT DOCUMENTS

| CN | 101739199 A | 6/2010 |
|---|---|---|
| JP | 4-326152 A | 11/1992 |
| JP | 2001-265309 A | 9/2001 |
| JP | 2009-222951 A | 10/2009 |
| JP | 2010-003260 A | 1/2010 |
| JP | 2010-135967 A | 6/2010 |
| WO | 2009/157382 A1 | 12/2009 |

OTHER PUBLICATIONS

Communication dated May 6, 2015 from the State Intellectual Property Office of the People's Republic of China in counterpart application No. 201180038547.5.
Communication dated Oct. 5, 2016 from the European Patent Office in counterpart Application No. 15 157 505.7.

* cited by examiner

*Primary Examiner* — Kumar Patel
*Assistant Examiner* — Insa Sadio
(74) *Attorney, Agent, or Firm* — Sughrue Mion, PLLC (57) ABSTRACT

A mobile terminal is provided as a solution to a problem in which ease use is low. Display part 1A is provided on casing A, while display part 1B is provided on casing B. Detector 2 detects the attitude of at least one of casings A and B and the opening/closing angle between casings A and B. Execution section 3 executes an application. Controller 4 displays a view of the application on at least one of display parts 1A and 1B in a display style according to detection results detected by detector 2.

12 Claims, 10 Drawing Sheets

MOBILE TERMINAL AND DISPLAY CONTROL METHOD

CROSS REFERENCE TO RELATED APPLICATIONS

This application is a National Stage of International Application No. PCT/JP2011/065257 filed Jul. 4, 2011, claiming priority based on Japanese Patent Application No. 2010-176254, filed Aug. 5, 2010, the contents of all of which are incorporated herein by reference in their entirety.

TECHNICAL FIELD

The present invention relates to a mobile terminal with two casings connected so as to be openable from and closable to each other and also relates to a display control method.

BACKGROUND ART

As a mobile terminal, there is a two-screen terminal equipped with two casings connected so as to be openable from and closable to each other and with a display screen on each casing. In some cases, a user using the two-screen terminal changes his/her style of using the terminal, for example, in the opening/closing angle between the casings and in the way of holding the two-screen terminal according to circumstances. Also, in some cases, the ease of seeing the display screens, the ease of using an application changes depending on the style of use.

Patent literature 1 discloses a display device that changes the contents of a display according to a change in a using style.

More specifically, the display device includes opening/closing detection means for detecting whether or not the opening/closing angle between two casings has become equal to 360°, and an angular velocity sensor that detects one of the two casings located below the other when the opening/closing angle becomes equal to 360°.

When the opening/closing angle between the casings having become equal to 360° is detected by the opening/closing detection means, display information displayed on the display screen provided on the casing located below and detected with the angular velocity sensor is displayed on the display screen on the casing located above.

In this way, the contents of a display on the display screen provided on the casing located below, at such a position as to be unseen from the user, can be checked through the display screen provided on the casing located above.

CITATION LIST

Patent Literature

Patent Literature 1: JP2009-222951A

SUMMARY OF INVENTION

Technical Problem

There are various styles of using the two-screen terminal and there is a problem that the convenience of the device to users is low if detection is enabled only as to whether the angle between the casings is to 360° and as to the above-below relationship, as in the case of the display device described in patent literature 1.

An object of the present invention is to provide a mobile terminal and a display control method as a solution to the above-described problem in which ease use is low.

Solution to Problem

A first mobile terminal according to the present invention is a mobile terminal with two casings connected so as to be openable from and closable to each other, the mobile terminal including two display parts respectively provided on the two casings, a detector that detects the attitude of at least one of the two casings and the opening/closing angle between the casings, an execution section capable of executing a first application, and a controller that, when the execution section executes the first application, displays a view of the first application on the display parts in a display style according to a detection result detected by the detector.

A second mobile terminal according to the present invention is a mobile terminal with two casings connected so as to be openable from and closable to each other, the mobile terminal including two display parts respectively provided on the casings, a detector that detects the attitudes of the casings, an execution section capable of executing a first application, and a controller that, when the execution section executes the first application, displays a view of the first application on the display parts in a display style according to a detection result detected by the detector.

A display control method according to the present invention is a display control method using a mobile terminal including two display parts provided on two casings connected so as to be openable from and closable to each other, the method including detecting the attitude of at least one of the two casings and the opening/closing angle between the casings, and displaying, when a first application is executed by the mobile terminal, a view of the first application on the display parts in a display style according to a result of the detection.

Advantageous Effect of Invention

The present invention enables improving the convenience to users.

DESCRIPTION OF EMBODIMENTS

Exemplary embodiments will be described below with reference to the drawings. In the following description, the same reference characters are assigned to components including the same functions. The description for the identical components is omitted in some cases.

Figure 1:
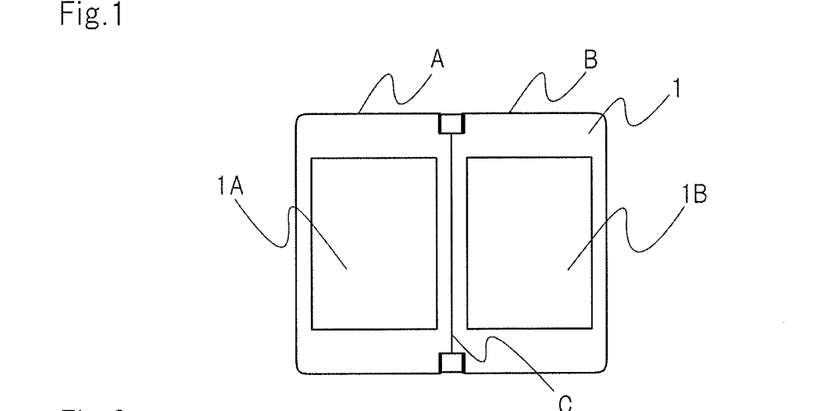
FIG. 1 is a schematic diagram showing a mobile terminal in a first exemplary embodiment.

FIG. 1 is a schematic diagram showing a mobile terminal according to a first exemplary embodiment. Referring to FIG. 1, mobile terminal 1 includes casings A and B.

Casings A and B are connected by a hinge mechanism or the like so as to be relatively rotatable on a predetermined opening/closing axis C. Casings A and B are thereby connected so as to be openable from and closable to each other. Display part 1A is provided on casing A, while display part 1B is provided on casing B.

Figure 2:
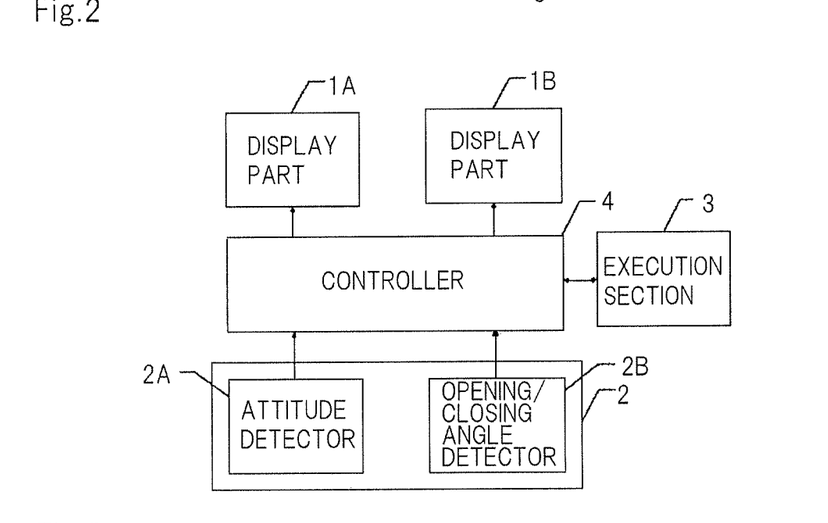
FIG. 2 is a block diagram showing the configuration of the mobile terminal in a first exemplary embodiment.

FIG. 2 is a block diagram showing the configuration of mobile terminal 1. Referring to FIG. 2, mobile terminal 1 includes display parts 1A and 1B, detector 2, execution section 3 and controller 4.

Detector 2 detects the attitude of at least one of casings A and B and the opening/closing angle between casings A and B. In the description below, detector 2 detects the attitude of casing A.

Detector 2 includes attitude detector 2A and opening/closing angle detector 2B.

Attitude detector 2A detects the attitude of casing A. Attitude detector 2A is, for example, a six-axis sensor provided in casing A and includes an earth's axis sensor and a three-axis angular velocity sensor. Attitude detector 2A detects, as the attitude of casing A, for example, the directions to which surfaces of casing A face, and the inclination of casing A from a reference plane such as a horizontal plane.

Opening/closing angle detector 2B detects the opening/closing angle between casings A and B.

Execution section 3 is capable of executing various application programs (hereinafter, referred to simply as "application"). In the present exemplary embodiment, execution section 3 executes an application by which display information to be displayed on display parts 1A and 1B is produced. By this application, possibility/impossibility information that indicates whether two-screen display for displaying the display information by spreading the display information on display parts 1A and 1B can be performed may be produced as well as the display information. The display information produced by the application is an example of a view of the application.

When execution section 3 executes an application, controller 4 displays display information produced by the application on at least one of display parts 1A and 1B while adjusting a display style according to detection results from detector 2. In other words, controller displays on at least one of display parts 1A and 1B a view of the application in a display style according to detection results from detector 2. The display style includes the orientation of the display information and the place in which the display information is displayed.

Processing in controller 4 will be described more concretely below.

Controller 4 obtains, as a state of inclination of mobile terminal 1, the orientation and inclination of an imaginary plane passing through each of the end sides of casings A and B parallel to opening/closing axis C and remote from opening/closing axis C based on detection results from detector 2. Controller 4 then adjusts the display style according to the state of inclination.

Figure 3:
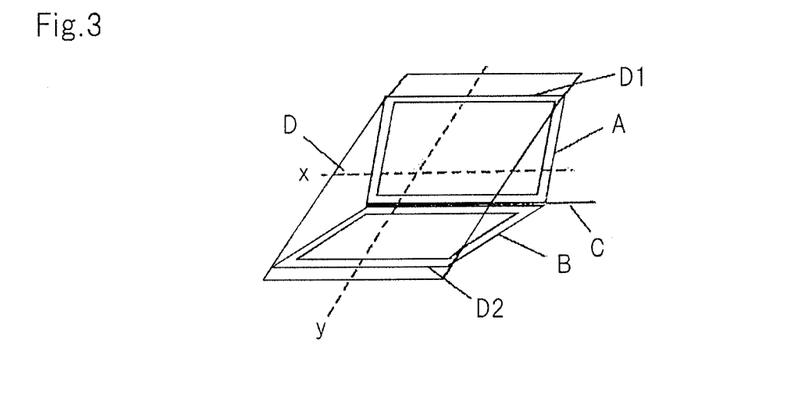
FIG. 3 is a diagram showing an example of an imaginary plane.

FIG. 3 is a diagram showing an example of the imaginary plane. As shown in FIG. 3, imaginary plane D passes through end side D1 of the end sides of casing A parallel to opening/closing axis C and remote from opening/closing axis C and through end side D2 of the end sides of casing B parallel to opening/closing axis C and remote from opening/closing axis C.

At first, a place in which display information is displayed will be described.

Controller 4 obtains a first inclination amount that is the present amount of inclination of a first direction (direction y in FIG. 3) on imaginary plane D perpendicular to opening/closing axis C with respect to an initial state of the first direction, and the direction of the inclination. In the following, a sign is attached to the first inclination amount according to the direction of this inclination to indicate the direction of inclination by the sign for the first inclination amount. More specifically, it is assumed that when the first direction of the imaginary plane D is inclined toward the display part A side, the plus sign is attached to the first inclination amount, and that when the first direction of the imaginary plane D is inclined toward the display part B side, the minus sign is attached to the first inclination amount.

Figure 4:
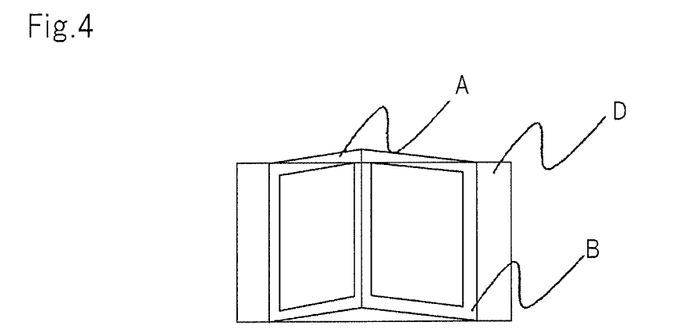
FIG. 4 is a diagram showing an example of an initial state of the imaginary plane.

The initial state of the first direction is, for example, the first direction of imaginary plane D when mobile terminal 1 is started up, the first direction of imaginary plane D when mobile terminal 1 executes the function to adjust the display style, or the first direction of imaginary plane D designated by a user. It is assumed that the initial state corresponds to a state in which mobile terminal 1 is being used so that imaginary plane D faces generally frontward as viewed from the user, as shown in FIG. 4.

Controller 4 determines whether or not the first inclination amount not including the minus sign (the absolute value of the first inclination amount) is equal to or larger than a first predetermined value.

Figure 5A:
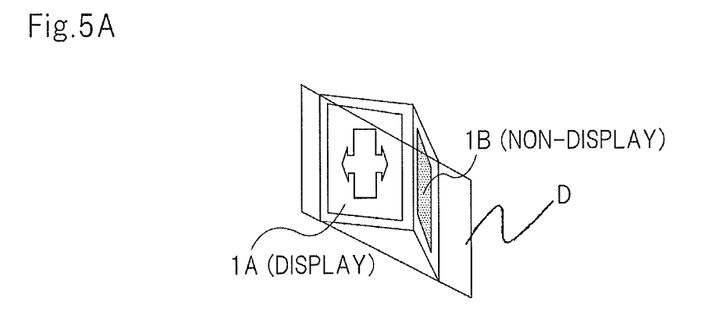
FIG. 5A is a diagram showing an example of the state of the imaginary plane.
Figure 5B:
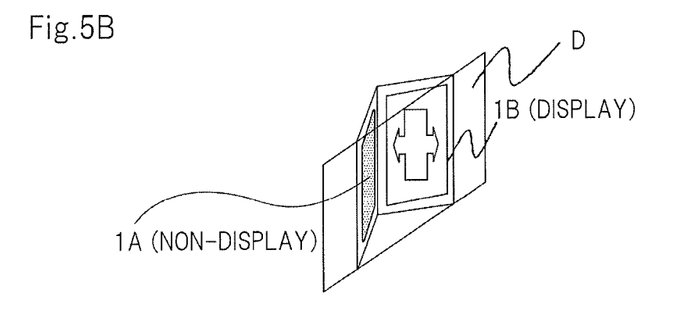
FIG. 5B is a diagram showing another example of the state of the imaginary plane.

When the first inclination amount not including the minus sign is equal to or larger than the first predetermined value, controller 4 identifies, based on the sign attached to the first inclination amount, one of display parts 1A and 1B located on the side toward which the first direction of imaginary plane D is inclined, and displays display information on the identified display part. For example, when the first inclination amount is positive, it is recognized that imaginary plane D is inclined toward the display part A side, as shown in FIG. 5A. As a result, the display information is displayed on display part 1A. When the first inclination amount is negative, it is recognized that imaginary plane D is inclined toward the display part B side, as shown in FIG. 5B. As a result, the display information is displayed on display part 1B.

Figure 5C:
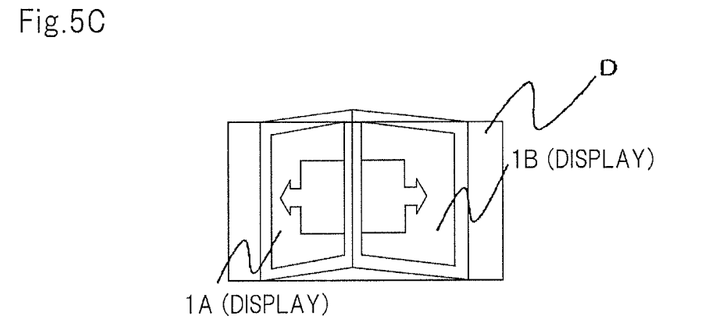
FIG. 5C is a diagram showing still another example of the state of the imaginary plane.

When the first inclination amount not including the minus sign is smaller than the first predetermined value, controller 4 displays the display information by spreading the display information on display parts 1A and 1B. By this display, as shown in FIG. 5C, when imaginary plane D is facing frontward as viewed from the user, the display information is displayed by being lengthened so that it appears on display parts 1A and 1B. At this time, controller 4 may perform full-screen display such that the display information is displayed on the entire areas of display part 1A and 1B.

In a case where possibility/impossibility information is generated by an application, when the first inclination amount is smaller than the first predetermined value, and when the possibility/impossibility information indicates that a two-screen display can be performed, controller 4 displays the display information by spreading the display information on display parts 1A and 1B. If the possibility/impossibility information indicates that a two-screen display is impossibility even when the first inclination amount is smaller than the first predetermined amount, controller 4 displays the display information on one of display parts 1A and 1B.

The first predetermined value may be determined by controller 4. For example, controller 4 may determine the first predetermined value according to the opening/closing angle as a detection result from opening/closing angle detector 2B. If the change in the opening/closing angle from 180° is increased, the possibility of the display part on the side toward which the first direction is inclined being hidden behind the other display part is increased and it becomes difficult to visually recognize display parts 1A and 1B simultaneously. Therefore, it is desirable that the first predetermined value be reduced as the change in the opening/closing angle from 180° increases.

The orientation of display information will be described.

Controller 4 obtains a second inclination amount that is the amount of inclination of the first direction of imaginary plane D (direction y in FIG. 3) from the horizontal plane, and a third inclination amount that is the amount of inclination of a second direction (direction x in FIG. 3) on imaginary plane D parallel to opening/closing axis C.

Controller 4 adjusts the orientation of display information according to the second inclination amount and the third inclination amount.

Figure 6A:
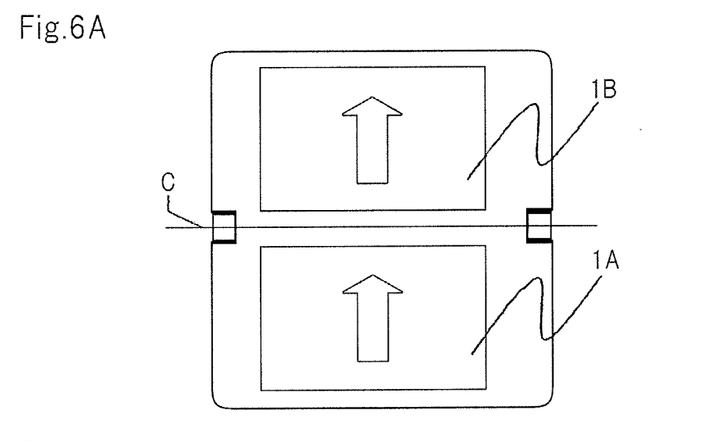
FIG. 6A is a diagram showing an example of placement of display parts seen from a user.

For example, when the second inclination amount is equal to or larger than a first threshold value, determined in advance, controller 4 determines that display parts 1A and 1B are vertically placed as viewed by the user, as shown in FIG. 6A, and displays the display information along a direction on display parts A1 and 1B perpendicular to opening/closing axis C. This is because in a case where the user uses mobile terminal 1 by placing display parts 1A and 1B vertically while holding mobile terminal 1 in his/her hand, the user ordinarily uses the terminal by inclining the first direction of imaginary plane D from the horizontal plane toward the user.

Figure 6B:
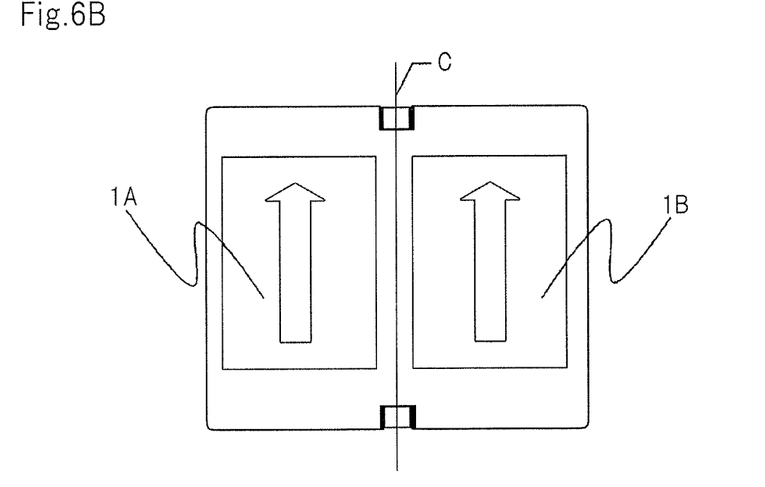
FIG. 6B is a diagram showing another example of placement of the display parts seen from the user.

When the third inclination amount is equal to or larger than a second threshold value, determined in advance, controller 4 determines that display parts 1A and 1B are placed laterally as viewed from the user, as shown in FIG. 6B, and displays the display information along a direction on display parts A1 and 1B and parallel to opening/closing axis C. This is because in a case where the user uses mobile terminal 1 by placing display parts 1A and 1B laterally while holding mobile terminal 1 in his/her hand, the user ordinarily uses the terminal by inclining the second direction of imaginary plane D from the horizontal plane toward the user.

In each of FIGS. 6A and 6B, each of the orientations of the display information is indicated by arrows, and the arrowheads indicate the top of the display information. Controller 4 displays the display information so that the bottom of the display information is positioned at the side in the display screens of display parts 1A and 1B on which imaginary plane D is inclined. When the second inclination amount is smaller than the first threshold value or when the third inclination amount is smaller than the second threshold value, controller 4 displays the display information in a predetermined orientation. At this time, the display information may be displayed in different orientations associated with display parts 1A and 1B.

Controller 4 also determines, based on the detection results from detector 2, whether or not at least one of casings A and B has been rotated around a normal to display part 1A by an angle equal to or larger than a first predetermined angle. The predetermined angle is, for example, 90° or a value slightly smaller than 90°.

When at least one of casings A and B has been rotated by an angle equal to or larger than a predetermined angle, controller 4 rotates the orientation of the display information to be rotated, i.e., the display information displayed on the display part provided on the rotated casing, by a second predetermined angle in the direction opposite to the direction of rotation of the rotated casing. The second predetermined angle is, for example, 90°.

If one of the casings is not rotated by an angle equal to or larger than the predetermined angle, controller 4 sets the orientation of the display information displayed on the display part provided on the casing not rotated to the same orientation as that of the display information to be rotated.

Figure 7:
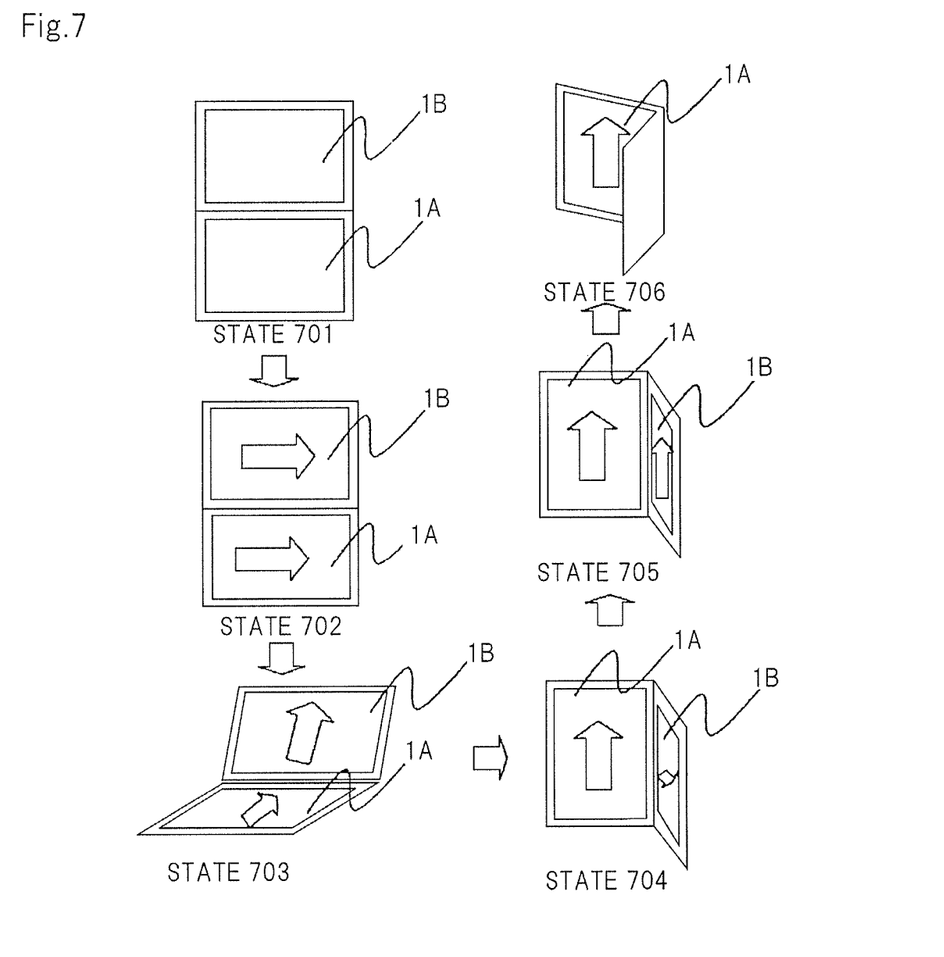
FIG. 7 is a diagram for explaining an example of the operation of the mobile terminal in the first exemplary embodiment.

An example of the operation of mobile terminal 1 will next be described. FIG. 7 is a diagram for explaining an example of the operation of mobile terminal 1. Each of the first predetermined angle and the second predetermined angle is assumed to be 90°.

First, mobile terminal 1 is assumed to be in state 701 shown in FIG. 7 when it is started up. In state 701, the opening/closing angle is 180°, imaginary plane D is horizontal and display parts 1A and 1B are vertically placed as viewed from the user. The inclination of the first direction of the imaginary plane in state 701 is assumed to the initial state of the first direction of the imaginary plane. It is also assumed that, in state 701, the second inclination amount is smaller than the first threshold value and the third inclination amount is smaller than the second threshold value.

It is assumed here that when mobile terminal 1 is in state 701, execution section 3 executes an application, and that display information and possibility/impossibility information indicating that two-screen display can be performed is generated by the application.

In this case, controller 4 displays the display information by spreading the display information on display parts 1A and 1B. At this time, since the second inclination amount is smaller than the first threshold value, and since the third inclination amount is smaller than the second threshold value, controller 4 cannot determine the orientation of the display information from detection results detected by detector 2. Therefore, controller 4 displays the orientation of the display information in accordance with a predetermined initial style. The initial style is assumed to be a display along a direction parallel to the opening/closing axis on display parts 1A and 1B.

Accordingly, controller 4 displays the display information as in state 702. In FIG. 7, the orientation of the display information is indicated by arrows as in FIGS. 6A and 6B.

In this case, the display information is in a lateral orientation as viewed by the user. The user increases the amount of second inclination of the imaginary plane to a value equal to or larger than the first threshold value by rotating casing B in such a direction that casings A and B are closed. Controller 4 then determines that the second inclination amount has become equal to or larger than the first threshold value, and displays the display information along directions perpendicular to the opening/closing axis on display parts 1A and 1B as in state 703.

It is assumed here that the user thereafter rotates casing A by 90° around the normal to display part 1A to place display parts 1A and 1B laterally as viewed by the user. In this case, controller 4 rotates the orientation of the display information on display part 1A by 90° in the direction opposite to the direction of rotation of casing A to set mobile terminal 1 to state 704, and thereafter sets the orientation of the display information on display part 1B on casing B to the same orientation as that of the display information on display part 1A, thereby setting the mobile terminal to state 705.

Controller 4 may simultaneously change the display information on display parts 1A and 1B to effect change of mobile terminal 1 from state 703 to state 705 instead of changing via state 704.

It is assumed that the user thereafter inclines the mobile terminal leftward (toward the casing A side) to increase the first inclination amount to a value equal to or larger than the first predetermined value. At this time, controller 4 reduces in size the display information that has been displayed on display parts 1A and 1B, and displays the display information only on display part 1A, thereby setting mobile terminal 1 to state 706.

In the present exemplary embodiment, as described above, display part 1A is provided on casing A and display part 1B is provided on casing B. Detector 2 detects the attitude of at least one of casings A and B and the opening/closing angle between casings A and B. Execution section 3 executes an application. Controller 4 displays display information (view) from the application in a display style according to detection results from detector 2 on at least one of display parts 1A and 1B.

In this case, a view in the display style according to the attitude of at least one of casings A and B and the opening/closing angle between casings A and B is displayed. Therefore, the style of displaying a view can be adjusted according to any of various styles in which the mobile terminal is used, thus improving the convenience to users.

Also, in the present exemplary embodiment, when the first inclination amount, i.e., the present amount of inclination of the first direction on the imaginary plane perpendicular to the opening/closing axis with respect to the initial state of the first direction is equal to or larger than the first predetermined value, controller 4 displays the display information on one of display parts 1A and 1B on the side toward which the first direction of the imaginary plane is inclined. In this case, even if one of the display parts is hidden behind the other display part so as to be difficult to see, the entire display information can be visually recognized without changing the manner of holding mobile terminal 1.

Also, in the present exemplary embodiment, controller 4 determines whether one of casings A and B has been rotated by an angle equal to or larger than the first predetermined angle around the normal to the display part provided on the casing. If one of the casings is rotated by an angle equal to or larger than the first predetermined angle, the orientation of the display information to be rotated, i.e., the display information displayed on the display part provided on the casing, is rotated by the second predetermined angle in the direction opposite to the direction of rotation of the casing. Also, the orientation of the display information displayed on the display part provided on the other casing is set to the same orientation as that of the display information to be rotated.

Therefore, even in a case where the opening/closing angle is not 180° and casings A and B are not rotated about the same axis, the display information on display part 1A and the display information on display part 1B can be set to the same orientation.

A second exemplary embodiment will be described.

Figure 8:
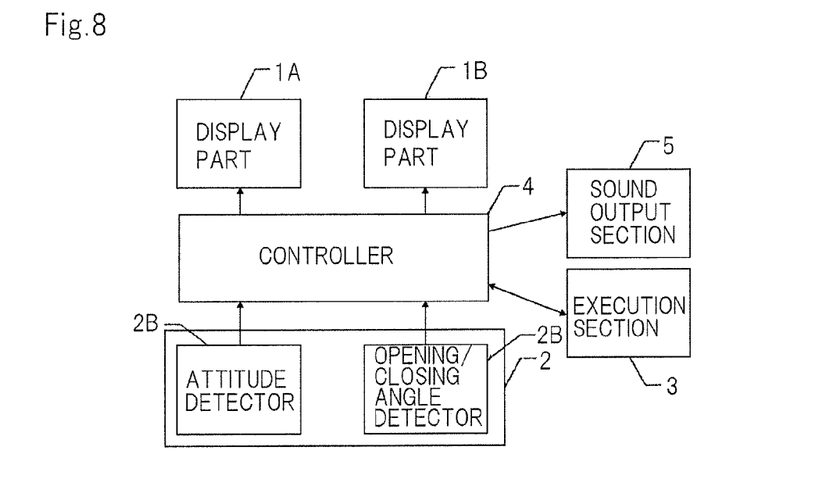
FIG. 8 is a block diagram showing the configuration of a mobile terminal in a second exemplary embodiment.

FIG. 8 is a block diagram showing the configuration of a mobile terminal according to the present exemplary embodiment. Referring to FIG. 8, mobile terminal 1 further includes a sound output section 5 such as a speaker, in addition to the components shown in FIG. 2. Sound output section 5 may be provided in each of casings A and B.

In the present exemplary embodiment, execution section 3 can execute a plurality of assigned applications by individually assigning applications to casings A and B. The applications to be assigned are an example of second applications.

When the first inclination amount is equal to or larger than a second predetermined value in the case where execution section 3 executes the second applications, controller 4 operates only the assigned application assigned to the casing on the side toward which the first direction of the imaginary line is inclined. The second predetermined value may be the same as the first predetermined value.

When the first inclination amount is smaller than the second predetermined value, controller 4 operates the assigned applications assigned to the casings.

Figure 9:
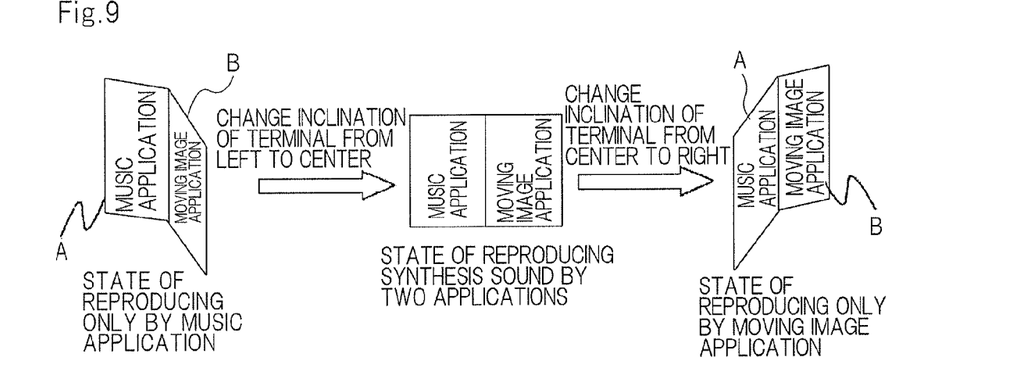
FIG. 9 is a diagram for explaining an example of the operation of the mobile terminal in the second exemplary embodiment.

FIG. 9 is a diagram for explaining the operation of the mobile terminal in the present exemplary embodiment. Referring to FIG. 9, a music application that is an application to reproduce musical piece data is assigned to casing A, while a moving image application that is an application to reproduce video data is assigned to casing B. It is assumed that casings A and B are laterally placed as viewed by the user; casing A is at the left-hand side; and casing B is at the right-hand side.

When the imaginary plane is inclined toward casing A, controller 4 operates only the music application and outputs, through sound output section 5, sound according to the musical piece data reproduced by the music application.

Thereafter, when the user directs the imaginary plane frontward, controller 4 operates both the music application and the moving image application, displays a moving image on display part 1B according to the video data reproduced by the moving image application, and outputs, through sound output section 5, synthesis sound produced by synthesizing the sounds according to the video data and the musical piece data.

Further, when the user inclines the imaginary plane toward the casing B side, controller 4 operates only the moving image application, displays on display part 1B a moving image according to a video signal reproduced by the moving image application, and outputs sound according to the video signal through sound output section 5.

In a case where sound output section 5 is provided in each casing, when the first inclination amount is equal to or larger than the second predetermined value, controller 4 may output sound only from sound output section 5 provided in the casing on the side toward which the first direction of the imaginary plane is inclined.

In the present exemplary embodiment, the operating applications can be changed by only inclining the mobile terminal.

A third exemplary embodiment will be described.

The configuration of the mobile terminal in the present exemplary embodiment is the same as that described with reference to FIG. 8. In the present exemplary embodiment, execution section 3 executes a functional application including two single functions individually assigned to casings A and B and a common function common to display parts 1A and 1B. The functional application is an example of a third application.

When the first inclination amount is equal to or larger than a third predetermined value, controller 4 makes the functional application perform the single function assigned to the casing on the side toward which the first direction of the imaginary plane is inclined. When the first inclination amount is smaller than the third predetermined value, controller 4 makes the assigned application perform the common function. The third predetermined value may be the same as the first predetermined value.

Figure 10:
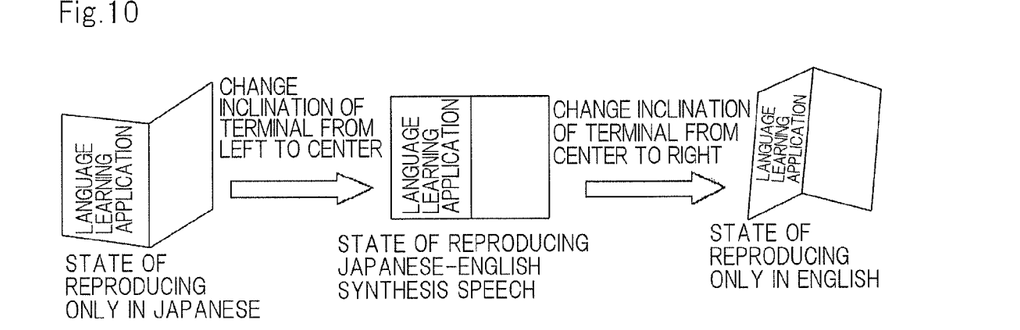
FIG. 10 is a diagram for explaining an example of the operation of a mobile terminal in a third exemplary embodiment.

FIG. 10 is a diagram for explaining the operation of mobile terminal 1 in the present exemplary embodiment. Referring to FIG. 10, execution section 3 executes as a functional application a language learning application that is an application for language learning (English learning). The language learning application has a Japanese reproduction function assigned to casing A and an English production function assigned to casing B, and has a Japanese-English simultaneous reproduction function as common function. It is assumed that casings A and B are placed laterally as viewed from the user; casing A is at the left-hand side; and casing B is at the right-hand side.

When the imaginary plane is inclined toward casing A, controller 4 makes the language learning application perform the Japanese reproduction function and outputs Japanese speech according to the Japanese reproduction function through sound output section 5.

Thereafter, when the user directs the imaginary plane frontward, controller 4 makes the language learning application perform the Japanese-English simultaneous reproduction function and outputs Japanese-English synthesis speech according to the Japanese-English simultaneous reproduction function through sound output section 5.

Further, when the user inclines the imaginary plane toward the casing B side, controller 4 makes the language learning application perform the English reproduction function and outputs English speech according to the English reproduction function through sound output section 5.

In the present exemplary embodiment, the functions of the application can be changed by only inclining the mobile terminal.

A fourth exemplary embodiment will be described.

In a case where display information displayed on one mobile terminal is simultaneously viewed by a plurality of persons, the plurality of persons may view the display information from different directions by placing the mobile terminal among them. In such a case, if the display information is displayed in only one orientation, some persons may view the display information in the opposite direction. It is not easy for those persons to recognize the contents of the display information. It is thought that in a case where display information is simultaneously viewed by a plurality of persons by placing the terminal among them, the terminal is ordinarily used in such a state that the angle between casings A and B is set to 180° and the imaginary plane is close to the horizontal position.

Figure 11A:
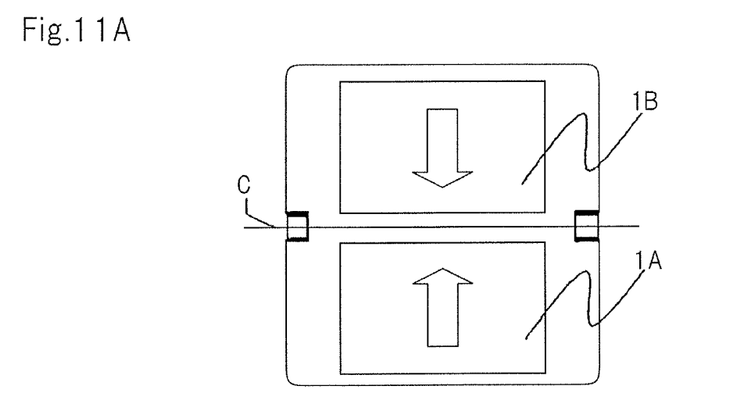
FIG. 11A is a diagram showing an example of orientation of display information.

In the present exemplary embodiment, therefore, controller 4 displays display information in opposite directions on display parts 1A and 1B, as shown in FIG. 11A, when the second inclination amount and the third inclination amount are smaller than a third threshold value.

Figure 11B:
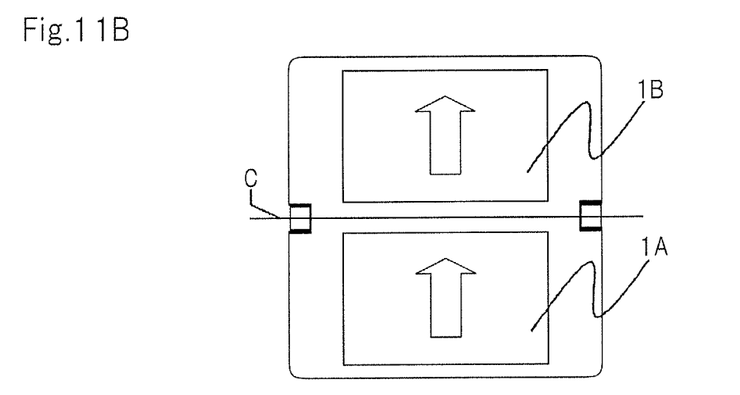
FIG. 11B is a diagram showing another example of orientation of display information.

When the second inclination amount and the third inclination amount are equal to or larger than the third threshold value, controller 4 displays on display parts 1A and 1B the display information in the same orientation, as shown in FIG. 11B.

In the present exemplary embodiment, even in the case where display information on the mobile terminal is viewed by a plurality of persons from different directions by placing the device among them, a situation in which some persons among them view the display information from different directions can be reduced.

A fifth exemplary embodiment will be described.

In the present exemplary embodiment, execution section 3 can execute a notification application capable of producing notification information to be notified to the user. The notification application is, for example, an electronic mail application for transmitting and receiving electronic mail, and the notification information is information for notifying the completion of reception of electronic mail. The notification application is an example of a fourth application.

It is thought that, in ordinary cases, if notification information is displayed on the display part provided on the casing moved comparatively largely when the casings are opened and closed, it is difficult to check the notification information.

When the notification application produces notification information, controller 4 identifies, based on detection results by detected by detector 2, from among casings 1A and 1B, that has the smaller amount of rotation on the opening/closing axis, and displays the notification information on the display part provided on the casing.

For example, when the notification application produces notification information, controller 4 obtains the amount of change in the opening/closing angle and the amount of change in the orientation of casing A in a certain time period based on detection results, and identifies the casing that has the smaller amount of rotation about the opening/closing axis based on the amounts of change.

In the present exemplary embodiment, the user is enabled to easily check notification information.

A sixth exemplary embodiment will be described.

Figure 12:
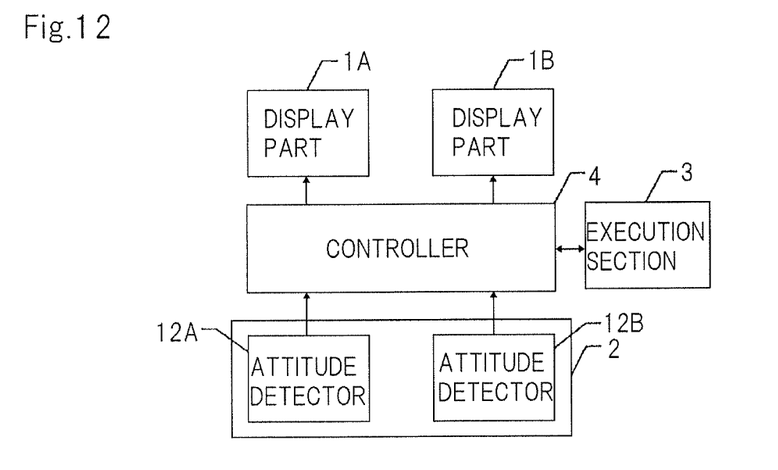
FIG. 12 is a block diagram showing the configuration of a mobile terminal in a fifth exemplary embodiment.

FIG. 12 is a block diagram showing the configuration of a mobile terminal in the present exemplary embodiment. Referring to FIG. 12, the mobile terminal differs from the mobile terminal shown in FIG. 2 in including detector 12 in place of detector 2. The outline of the mobile terminal in the present exemplary embodiment is the same as that shown in FIG. 1.

Detector 12 detects the attitudes of casings A and B. More specifically, detector 12 includes attitude detector 12A provided in casing A and attitude detector 12B provided in casing B.

Attitude detector 12A detects the attitude of casing A. Attitude detector 12B detects the attitude of casing B.

Controller 4 adjusts the style of displaying display information produced by an application executed by execution section 3 according to detection results detected by detector 12, and displays the display information on at least one of display parts 1A and 1B.

Also in the present exemplary embodiment, the display style can be adjusted, as in the first exemplary embodiment, thus improving ease of use.

A seventh exemplary embodiment will be described.

The present exemplary embodiment will be described with respect to a concrete example of the relationship between detection results detected by detector 2 and a display style.

In the following description, a horizontal plane is represented by XZ-plane and the direction perpendicular to the horizontal plane is represented by Y-direction. The angles between opening/closing angle C between casings A and B and coordinate axes X, Y, and Z are represented by orientation angles θx, θy, and θz.

Figure 13A:
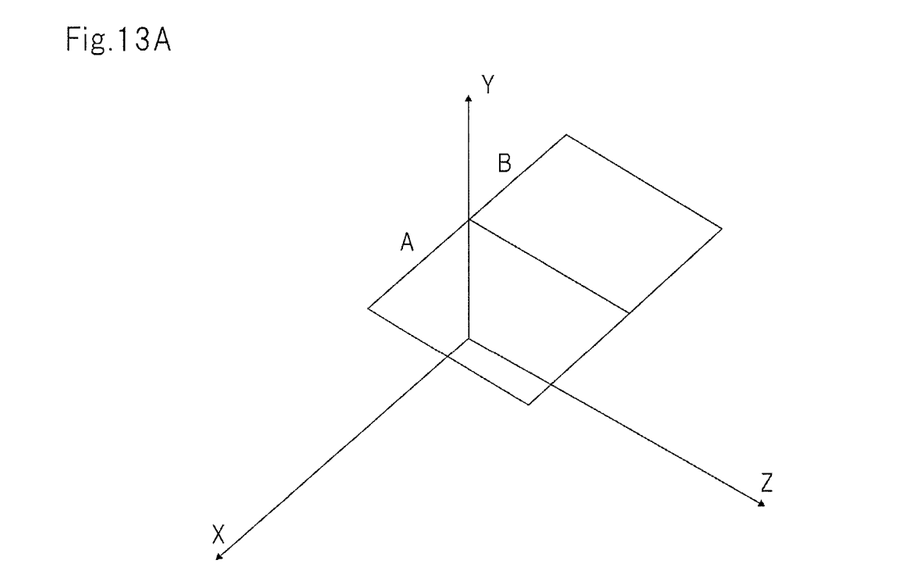
FIG. 13A is a diagram for explaining an example of display of display information.

As a state of mobile terminal 1, a first state in which opening/closing angle γ between casings A and B is 180° and a normal vector on casing A is directed along the Y-direction (FIG. 13A) will be considered. Mobile terminal 1 is assumed to be in such an orientation that each of the orientation angles θx and θy is 90° and the orientation angle θz is 0°. In this first state, display information is displayed on both display parts 1A and 1B. However, the orientation of the display information is not particularly specified.

Figure 13B:
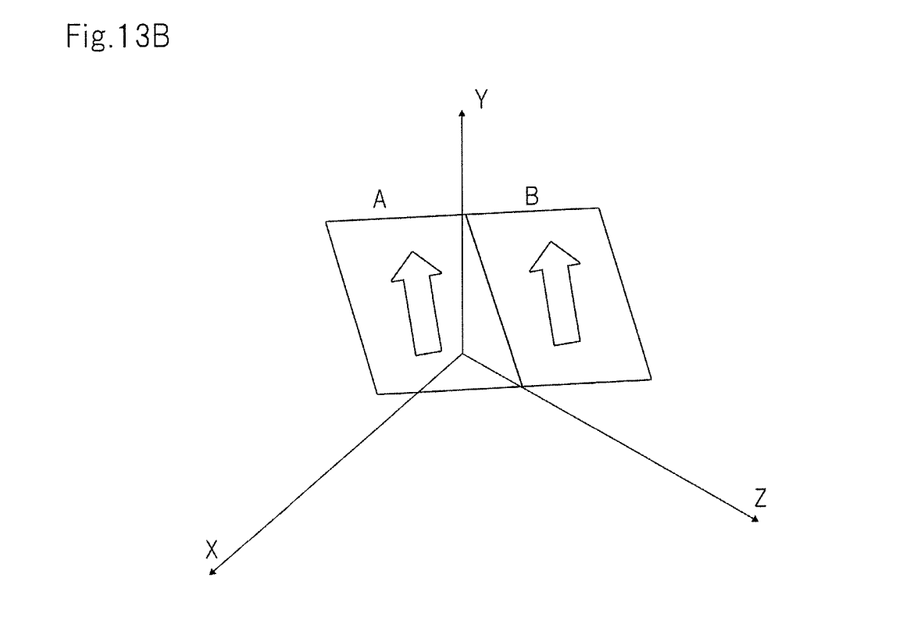
FIG. 13B is a diagram for explaining another example of display of display information.

It is assumed that, from the first state, casing A is rotated by 45° or more about the X-axis while opening/closing angle γ is not changed (FIG. 13B). In this case, the display information is displayed along the direction parallel to opening/closing axis C on display parts 1A and 1B (second state), as shown in FIG. 6B.

Figure 13C:
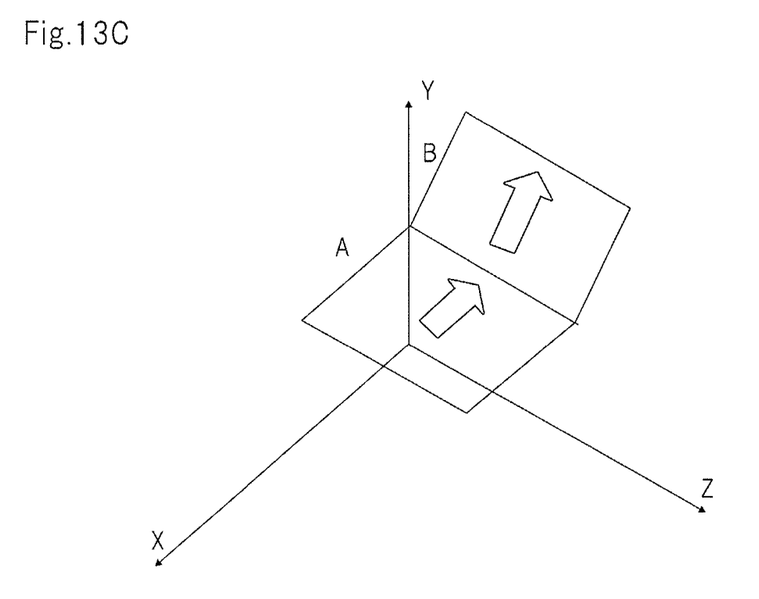
FIG. 13C is a diagram for explaining still another example of display of display information.

It is also assumed that, from the first state, opening/closing angle γ is changed in a range from 90° to 135° while the attitude of casing A is not changed (FIG. 13C). In this case, the display information is displayed along directions perpendicular to opening/closing angle C (third state), as shown in FIG. 6A.

Figure 13D:
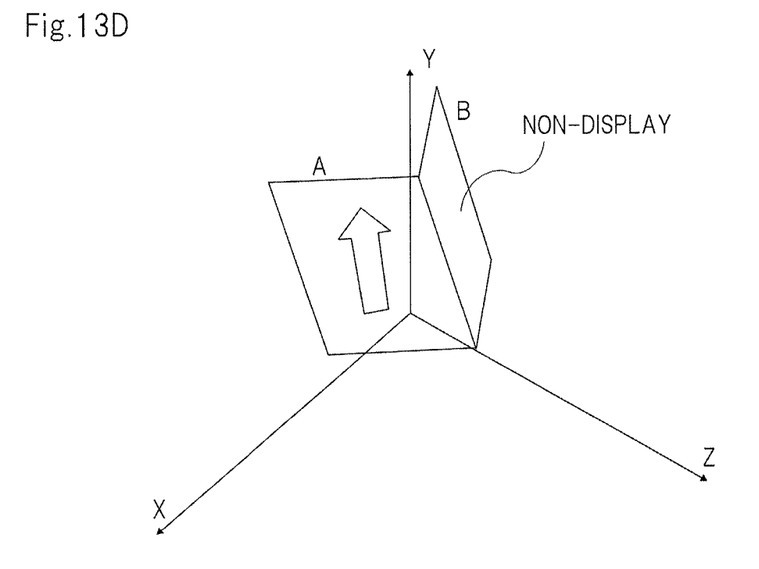
FIG. 13D is a diagram for explaining yet another example of display of display information.

It is also assumed that, from the second state, opening/closing angle 7 is set to an angle equal to or smaller than 90° while the attitude of casing A is not changed (FIG. 13D). This state corresponds to a case where casing B is rotated by an angle equal to or larger than 45° about the Y-axis and is also rotated by an angle equal to or larger than 45° about the Z-axis. In this state, the display information is displayed only on display part 1A (fourth state), as shown in FIG. 5A.

Figure 13E:
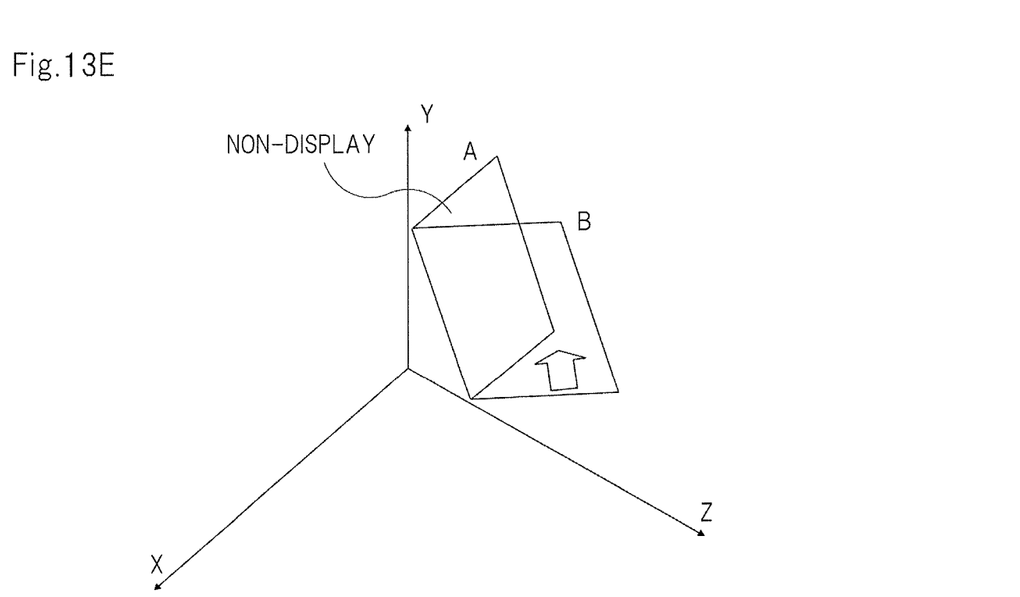
FIG. 13E is a diagram for explaining a further example of display of display information.

It is also assumed that, from the second state, casing A is rotated by an angle equal to or larger than 45° about the Y-axis and is rotated by an angle equal to or larger than 45° about the Z-axis, and opening/closing angle γ is set to an angle equal to or smaller than 90° (FIG. 13E). In this state, the display information is displayed only on display part 1B (fifth state), as shown in FIG. 5B.

Figure 13F:
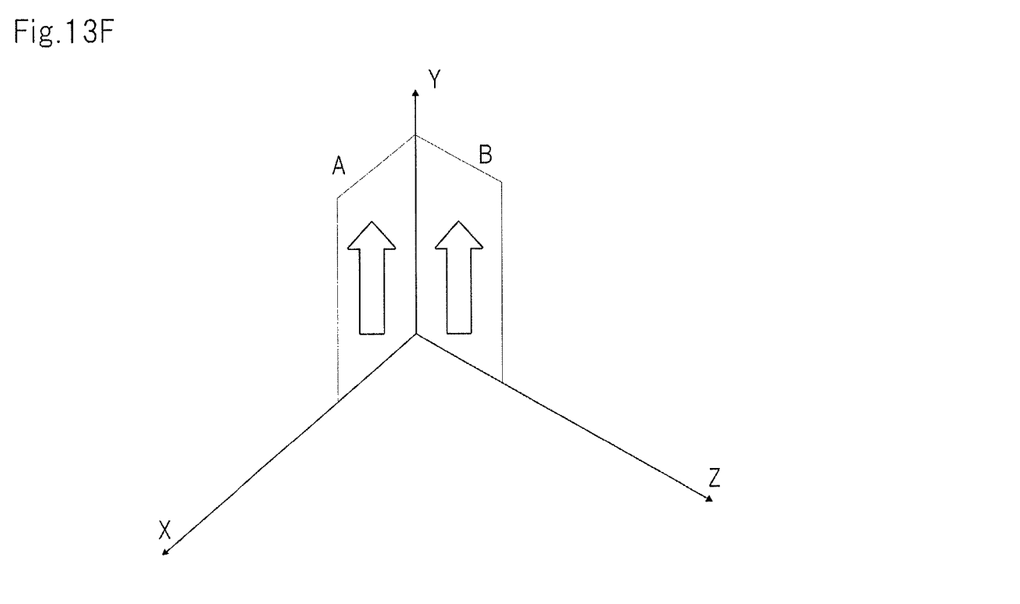
FIG. 13F is a diagram for explaining a still further example of display of display information.

It is also assumed that, from the third state, casing A is rotated by an angle of about 90° about the X-axis (FIG. 13F). In this state, the display information is displayed along a line parallel to opening/closing axis C on display parts 1A and 1B (sixth state), as shown in FIG. 6B.

Figure 13G:
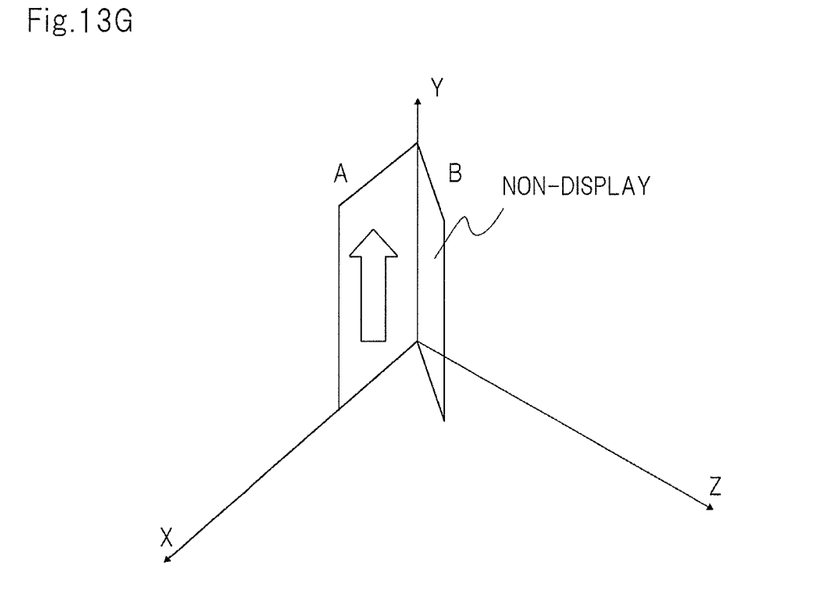
FIG. 13G is a diagram for explaining a still further example of display of display information.

It is also assumed that, from the sixth state, casing B is rotated about the Y-axis to change opening/closing angle γ to 45° (FIG. 13G). In this case, the display information is displayed only on display part 1A, as shown in FIG. 5A.

The configuration in each of the above-described exemplary embodiments is only an example. The present invention is not limited to the described configurations.

Figure 14:
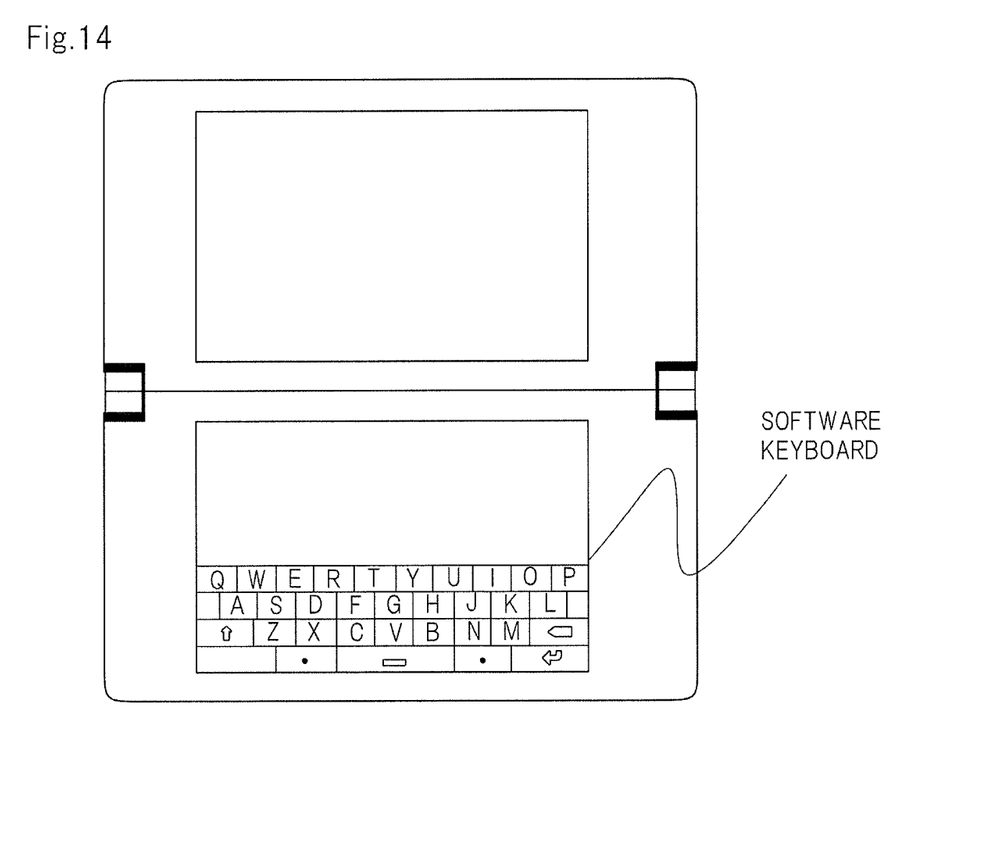
FIG. 14 is a diagram showing an example of display information.

For example, a touch panel may be provided in display parts 1A and 1B. In such a case, the display information may include a software keyboard, such as shown in FIG. 14, for inputting information through the touch panel.

This application is based upon and claims the benefit of priority from the prior Japanese Patent Application No. 2010-176254, filed on Aug. 5, 2010; the entire contents of which are incorporated herein by reference.

What is claimed is:

1. A mobile terminal with two casings connected so as to be openable from and closable to each other, the mobile terminal comprising:
    two display parts respectively provided on the two casings;
    a first detector configured to detect a first attitude of a first casing of the two casings and an opening/closing angle between the casings;
    a second detector configured to detect a second attitude of a second casing of the two casings;
    an execution section capable of executing a first application; and
    a controller that, when said execution section executes the first application, displays displayed contents of the first application on said display parts in a display style according to a detection result detected by said detector, wherein
    said controller is configured to detect, based on a detection result of the first attitude, the second attitude and the opening/closing angle, an orientation and an inclination of an imaginary plane that is parallel to an opening/closing axis between the casings and that passes through end sides of the casings remote from the opening/closing axis, and adjusts at least one of the display contents to be either laterally aligned with respect to the opening/closing axis or perpendicularly aligned with respect to the opening/closing axis according to the orientation and the inclination of the imaginary plane.

2. The mobile terminal according to claim 1, wherein, when a first inclination amount that is the amount of inclination of a first direction on the imaginary plane perpendicular to the opening/closing axis with respect to an initial state of the first direction is equal to or larger than a first predetermined value, said controller displays the view on one of the display parts provided on the casing on the side toward which the first direction of the imaginary plane is inclined.

3. The mobile terminal according to claim 2, wherein, when the first inclination amount is smaller than the first predetermined value, said controller displays the view lengthening the view so that it is displayed on both the display parts.

4. The mobile terminal according to claim 3, wherein said first application is further configured to produce possibility/impossibility information indicating whether or not two-screen display for displaying the view by lengthening the view so that it is displayed on both the display parts can be performed, and wherein, when the first inclination amount is smaller than the first predetermined value, and when the possibility/impossibility information indicates that two-screen display can be performed, said controller displays the view by lengthening the view so that it is displayed on both the display parts.

5. The mobile terminal according to claim 1, wherein, when a second inclination amount that is the amount of inclination from the horizontal plane of the first direction on the imaginary plane perpendicular to the opening/closing axis is equal to or larger than a first threshold value, said controller displays the view along a direction on the display parts perpendicular to the opening/closing axis, and wherein, when a third inclination amount that is the amount of inclination from the horizontal plane of a second direction on the imaginary plane parallel to the opening/closing axis is equal to or larger than a second threshold value, said controller displays the view along a direction parallel to the opening/closing axis.

6. The mobile terminal according to claim 1, wherein, when a second inclination amount that is the amount of inclination from a horizontal plane of a first direction on the imaginary plane perpendicular to the opening/closing axis and a third inclination amount that is the amount of inclination from the horizontal plane of a second direction on the imaginary plane parallel to the opening/closing axis are smaller than a third threshold value, said controller displays the view so that the view is displayed in opposite directions on the respective display parts, and wherein, when the second inclination amount or the third inclination amount is equal to or larger than the third threshold value, said controller displays the view on the display parts so that the view is displayed in the same direction on the display parts.

7. The mobile terminal according to claim 1, wherein said execution section is further configured to individually assign each of a plurality of second applications to one of the casings and can execute the second applications, wherein, when said execution section executes the second applications, and when a first inclination amount that is the amount of inclination of a first direction on the imaginary plane perpendicular to the opening/closing axis with respect to an initial state of the first direction is equal to or larger than a second predetermined value, said controller operates only the second application assigned to the casing on the side toward which the first direction of the imaginary plane is inclined, and wherein, when the first inclination amount is smaller than the second predetermined value, the controller operates the second applications assigned to the casings.

8. The mobile terminal according to claim 1, wherein said execution section is further configured to execute a third application comprising two single functions individually assigned to the casings and a common function common to the display parts, wherein, when said execution section executes a third application, and when a first inclination amount that is the amount of inclination of a first direction on the imaginary plane perpendicular to the opening/closing axis with respect to an initial state of the first direction is equal to or larger than a third predetermined value, said controller makes the third application perform the single function assigned to the casing on the side toward which the first direction of the imaginary plane is inclined, and wherein, when the first inclination amount is smaller than the third predetermined value, said controller makes the third application perform the common function.

9. The mobile terminal according to claim 1, wherein said controller is further configured to display the view based on the detection result, and determines whether or not one of the casings has been rotated by an angle equal to or larger than a first predetermined angle around a normal to the display part provided on the one of the casings, and wherein if one of the casings has been rotated by an angle equal to or larger than the first predetermined angle, said controller rotates the orientation of the view to be rotated that is the view displayed on the display part provided on the casing, by a second predetermined angle in the direction opposite to the direction of rotation of the casing, and sets the orientation of the view displayed on the display part provided on the other casing to the same orientation as that of the view to be rotated.

10. The mobile terminal according to claim 1, wherein said execution section is further configured to execute a fourth application capable of producing notification information to be notified to a user, and wherein, when the fourth application produces notification information, said controller identifies, based on the detection result, one of the casings with a smaller amount of rotation on the opening/closing axis, and displays the notification information on the display part provided on the casing.

11. A mobile terminal with two casings connected so as to be openable from and closable to each other, the mobile terminal comprising:
two display parts respectively provided on the casings;
a first detector configured to detect a first attitude of a first casing of the casings;
a second detector configured to detect a second attitude of a second casing of the casings;
an execution section capable of executing a first application; and
a controller that, when said execution section executes the first application, displays displayed contents of the first application on said display parts in a display style according to a detection result detected by said detector, wherein
said controller detects, based on a detection result of the first attitude, the second attitude and the opening/closing angle, an orientation and an inclination of an imaginary plane that is parallel to an opening/closing axis between the casings and that passes through end sides of the casings remote from the opening/closing axis, and adjusts at least one of the display contents to be either laterally aligned with respect to the opening/closing axis or perpendicularly aligned with respect to the opening/closing axis according to the orientation and the inclination of the imaginary plane.

12. A display control method using a mobile terminal comprising two display parts provided on two casings connected so as to be openable from and closable to each other, the method comprising:
detecting, by a first detector, a first attitude of a first casing of the two casings and an opening/closing angle between the casings;
detecting, by a second detector, a second attitude of a second casing of the two casings;
displaying, when a first application is executed by said mobile terminal, displayed contents of the first application on said display parts in a display style according to a result of the detection;
detecting, based on a detection result of the first attitude, the second attitude and the opening/closing angle, an orientation and an inclination of an imaginary plane that is parallel to an opening/closing axis between the casings and that passes through end sides of the casings remote from the opening/closing axis; and
adjusting at least one of the display contents to be either laterally aligned with respect to the opening/closing axis or perpendicularly aligned with respect to the opening/closing axis according to the orientation and the inclination of the imaginary plane.

* * * * *

UNITED STATES PATENT AND TRADEMARK OFFICE
CERTIFICATE OF CORRECTION

PATENT NO. : 9,558,709 B2
APPLICATION NO. : 13/702513
DATED : January 31, 2017
INVENTOR(S) : Yifeng Zhou It is certified that error appears in the above-identified patent and that said Letters Patent is hereby corrected as shown below:

In the Specification

Column 11, Line 51:
"angle 7" should be --angle $\gamma$--.

Signed and Sealed this
Eighth Day of May, 2018

Andrei Iancu
*Director of the United States Patent and Trademark Office*